United States Patent [19]
Belmear, Jr.

[11] 3,861,802
[45] Jan. 21, 1975

[54] AN IMPROVED TURBIDIMETER LENS FOR REDUCING THE TENDENCY OF MIXTURES OF IMMISCIBLE FLUIDS TO FORM FILMS OF THE LENSES

[75] Inventor: Clinton A. Belmear, Jr., Ponca City, Okla.

[73] Assignee: Continental Oil Company, Ponca City, Okla.

[22] Filed: July 2, 1973

[21] Appl. No.: 375,402

[52] U.S. Cl. .................. 356/208, 250/573, 350/61, 350/175 NG, 356/103, 356/181
[51] Int. Cl. ............................................ G01n 21/26
[58] Field of Search .......... 356/208, 207, 103, 181, 356/246, 70; 350/61, 175 NG; 117/124 E; 250/573

[56] References Cited
UNITED STATES PATENTS
| | | | |
|---|---|---|---|
| 2,633,472 | 3/1953 | Eberz | 356/181 |
| 3,423,443 | 1/1969 | Blochl | 356/208 |
| 3,515,491 | 6/1970 | Emary | 356/246 |
| 3,573,470 | 4/1971 | Haley | 356/208 |
| 3,617,757 | 11/1971 | Burr et al. | 356/208 |

FOREIGN PATENTS OR APPLICATIONS
| | | | |
|---|---|---|---|
| 1,369,577 | 7/1964 | France | 350/175 NG |

Primary Examiner—Vincent P. McGraw
Attorney, Agent, or Firm—F. Lindsey Scott

[57] ABSTRACT

In a turbidimeter for determining the turbidity of liquids, the improvement comprising separating the light source and the light sensor from the liquids by covering the light source and light sensor with a fluorocarbon resin.

7 Claims, 3 Drawing Figures

PATENTED JAN 21 1975

3,861,802

AN IMPROVED TURBIDIMETER LENS FOR REDUCING THE TENDENCY OF MIXTURES OF IMMISCIBLE FLUIDS TO FORM FILMS OF THE LENSES

FIELD OF THE INVENTION

This invention relates to turbidimeters. This invention further relates to an improvement in turbidimeters whereby the light source and light sensor are separated from the liquids being analyzed by a fluorocarbon resin.

DESCRIPTION OF THE PRIOR ART

Numerous types of turbidimeters are known for determining the turbidity of liquids, mixtures of immiscible liquids, and the like. Most such turbidimeters utilize a light source and a light sensor, which transmit light into the turbid liquid and sense the amount of light reflected from or transmitted through the liquid. In many such applications, the liquids analyzed are mixtures of immiscible fluids, such as oil and water.

A major problem in the use of turbidimeters is that when immiscible fluids are present in the liquid analyzed, one or the other of the fluids often tends to form a film on the light sensor and light source covers, thereby rendering the test results inaccurate. Since many liquids which are analyzed for turbidity are mixtures of immiscible fluids, a continuing search has been directed to a method by which this problem may be overcome.

OBJECT OF THE INVENTION

It is an objective of the present invention to provide an improvement in turbidimeters whereby mixtures of immiscible fluids may be analyzed. It is a further objective of the present invention to provide an improved turbidimeter such that when mixtures of immiscible fluids are analyzed, the tendency of one or the other of said fluids to form a film on the light sensor and light source covers is minimized.

SUMMARY OF THE INVENTION

It has now been found that the objectives of the present invention are accomplished in an improvement in a turbidimeter having a light source and a light sensor for determining the turbidity of liquids by an improvement comprising separating the light source and the light sensor from the liquids by covering the light source and light sensor with a fluorocarbon resin.

DESCRIPTION OF PREFERRED EMBODIMENTS

Figure 1:
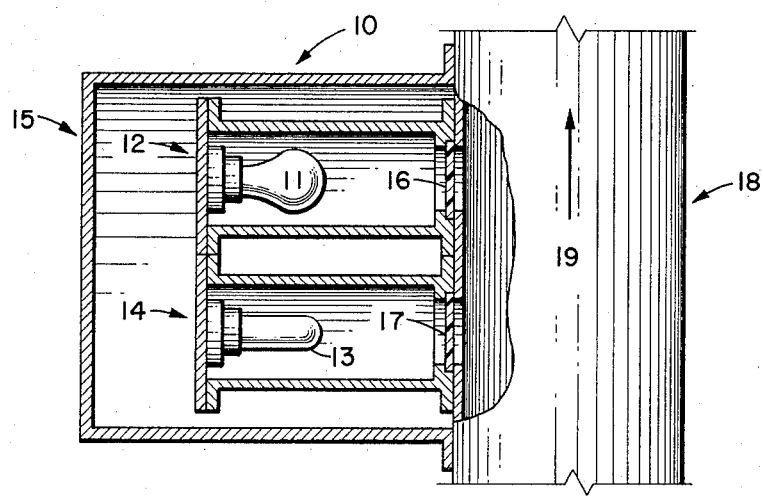
FIG. 1 shows an embodiment of the present invention wherein the light source and the light sensor are parallel.

In FIG. 1, a turbidimeter 10 is shown. The turbidimeter comprises a light source 11 positioned in a light source casing 12, a light sensor 13 positioned in a light sensor casing 14 and positioned on a liquid line 18. The light sensor and the light source are enclosed in a turbidimeter casing 15. It will be noted that the light source emits light into liquid 19 flowing in the liquid line through the light source lens 16. The light is reflected by the turbidity of the liquid and transmitted through light sensor lens 17 and detected by the light sensor.

The improvement of the present invention comprises separating the light source and the light sensor from the liquid analyzed by a fluorocarbon resin. Accordingly, Lenses 16 and 17 are fluorocarbon resin lenses.

Figure 2:
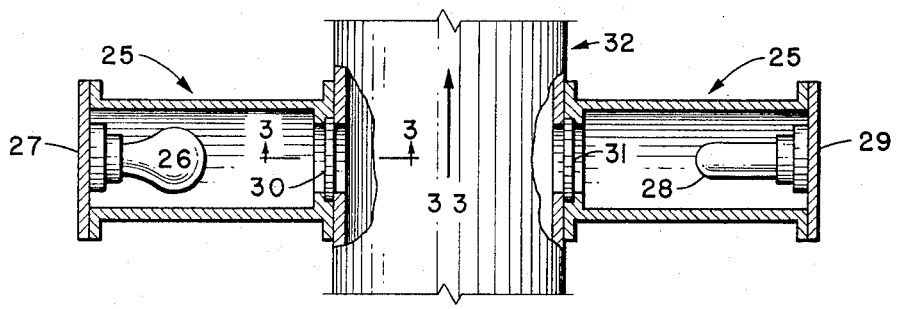
FIG. 2 shows an embodiment of the present invention wherein the light source and the light sensor are opposed.

FIG. 2 shows a different embodiment of a turbidimeter in which the light source and the light sensor are opposed. The turbidimeter 25 has a light source 26, positioned in a light source casing 27. The light source emits light into a liquid sample 33 contained in a liquid line 32. A portion of the light is transmitted through the liquid to a light sensor 28 positioned in a light sensor casing 29. The light is transmitted through light source lens 30 and received by the light sensor through the light sensor lens 31.

Figure 3:
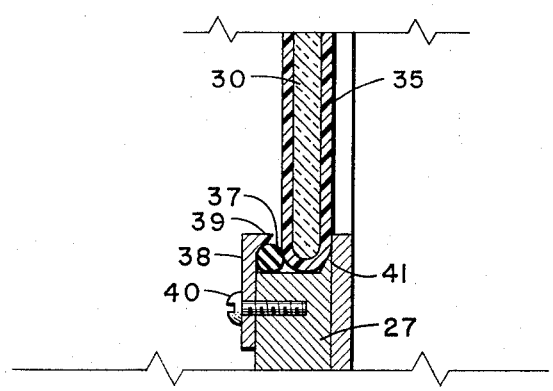
FIG. 3 shows a section of a glass lens coated with a fluorocarbon resin.

In a further embodiment of the present invention, conventional lens materials may be coated with a fluorocarbon resin to achieve desirable results. In FIG. 3, a cross section of lens 30 is shown. The lens is of a suitable transparent material, such as glass, and is coated with a fluorocarbon resin 35. The lens is shown sealingly positioned in the light source case 27. The lens is sealingly positioned by positioning it adjacent a retaining lip 41 and thereafter positioning an O-ring 37 adjacent the lens and thereafter positioning a sealing ring 38 so that the O-ring is held in position by the sealing ring and positioner 39 and sealingly joins the lens and the light source casing. The ring is maintained in position by screws 40.

The foregoing description of preferred embodiments is illustrative in nature, and it should be understood that many variations are possible within the scope of the present invention. In particular, it has been discovered that in the analysis of mixtures of immiscible liquids in turbidimeters such as shown in FIGS. 1 and 2, when fluorocarbon resins are used to fabricate lenses or coat lenses of other transparent materials, the tendency of liquids comprising the mixtures of immiscible fluids to form films on the lenses is minimized and in many cases eliminated entirely. It is readily seen that such elimination of the film results in much more desirable determination of the turbidity of liquids. No completely satisfactory explanation is now available to applicants as to exactly why the immiscible fluids do not form films and the like on the fluorocarbon resins in turbidimeters as shown.

The improvement of the present invention has been found applicable to turbidimeters wherein the light source and the light sensor are positioned parallel to each other and in turbidimeters wherein the light source and the light sensor are opposed to each other, the primary difference in the two types of turbidimeters being the measurement of light reflected by the turbidity of the liquids or the measurement of the light transmitted through the liquids.

The primary requisite in the fluorocarbon resin is that it be transparent to light and in many applications it is also preferred that the resin surface be oleophobic. The fluorocarbon resin may be used to form lenses or to coat lenses of other suitable transparent material, such as glass and the like. The essence of the improvement of the present invention comprises separating the turbid fluid from the light sensor and light source by a fluorocarbon resin or a fluorocarbon resin coated material so that light may readily be transmitted into the turbid liquids without the complicating factor of the formation of films and the like on the lenses through which the light is transmitted.

Very desirable results have been obtained wherein the fluorocarbon resin used is polytetrafluorethylene. Polytetrafluoroethylene is well known as Teflon, a trademark of E. I. DuPont De Nemours and Company Incorporated of Wilmington, Delaware. It is well known in the art that Teflon may be coated onto numerous materials, such as glass and the like, and accordingly it is believed that no further discussion is necessary with respect to methods for coating lenses with Teflon.

In a desired embodiment of the present invention, the liquids analyzed are in direct contact with the fluorocarbon resin lenses, which separate them from the light source and the light sensor. In embodiments such as shown in FIG. 1, the turbidimeter may be used directly on the line carrying the turbid fluid. Such an embodiment is very desirable for monitoring waste streams, process streams, and the like wherein the turbidity is a measure of some desired property of the stream, such as the proportion of one immiscible fluid in a second immiscible fluid and the like. Of course, such mixtures are found commonly in waste streams, refinery process streams, and the like. A common use for such turbidimeters is the monitoring of oil-aqueous streams which contain varying amounts of oil and optionally varying amounts of solid materials. Such streams are frequently analyzed for turbidity in order to control the amount of oil, solids, and the like which are contained in the aqueous stream.

The improvement of the present invention is also useful in turbidimeters wherein the light source and the and sensor are not positioned adjacent the liquid analyzed but wherein sprays or mists of the liquid analyzed contact the lens protecting the liquid source and the light sensor. In such applications, the tendency of the immiscible fluids to form films on the lenses is minimized although most desirable results have been obtained wherein such lenses were in direct contact with the liquid analyzed. As noted hereinbefore, the foregoing description of preferred embodiments is illustrative in nature, and many variations and modifications within the scope of the present invention are possible, and it is believed that many such variations and modifications may appear obvious or desirable to those skilled in the art upon a review of the foregoing drawings and description of preferred embodiments.

Having described the invention, I claim:

1. In a turbidimeter having a light source and a light sensor for determining the turbidity of liquids, the improvement comprising separating said light source and said light sensor from said liquids with a fluorocarbon resin lens which allows the passage of light therethrough, thereby minimizing the tendency of said liquids to form films on said lenses.

2. The improvement of claim 1 wherein said liquids comprise mixtures of immiscible fluids.

3. The improvement of claim 2 wherein said light source and said light sensor are parallel.

4. The improvement of claim 2 wherein said light source is directed toward said light sensor.

5. The improvement of claim 2 wherein said liquids contain oil and water.

6. The improvement of claim 2 wherein said fluorocarbon resin is polytetrafluoroethylene.

7. In a turbidimeter having a light source and a light sensor for determining the turbidity of liquids, the improvement comprising separating said light source and said light sensor from said liquids with a transparent lens coated with a fluorocarbon resin which allows the passage of light therethrough, thereby minimizing the tendency of said liquids to form films on said lenses.

* * * * *